United States Patent [19]

Swanson et al.

[11] 4,090,248
[45] May 16, 1978

[54] SUPERVISORY AND CONTROL SYSTEM FOR ENVIRONMENTAL CONDITIONING EQUIPMENT

[75] Inventors: James R. Swanson, Glenview; Sam DiCesare, Wilmette; Richard C. Barthel, Chicago, all of Ill.

[73] Assignee: Powers Regulator Company, Skokie, Ill.

[21] Appl. No.: 625,649

[22] Filed: Oct. 24, 1975

[51] Int. Cl.$^2$ .................. G06F 3/04; G06F 15/46; H04Q 9/00; H04Q 11/00
[52] U.S. Cl. .................. 364/900; 340/163; 340/147 R; 165/22; 236/DIG. 8
[58] Field of Search .............. 340/172.5, 163, 147 R, 340/147 C; 235/151, 151.1; 236/1 B, 1 C, DIG. 8, 78 R, 78 D; 165/13, 22; 364/200, 900

[56] References Cited

U.S. PATENT DOCUMENTS

| | | | |
|---|---|---|---|
| 3,400,374 | 9/1968 | Schumann | 340/172.5 |
| 3,403,382 | 9/1968 | Frielinghaus | 340/172.5 |
| 3,427,588 | 2/1969 | Mauzey | 340/163 R |
| 3,522,588 | 8/1970 | Clarke, Jr. | 340/147 R |
| 3,529,293 | 9/1970 | Sullivan | 340/163 R |
| 3,559,177 | 1/1971 | Benson | 340/163 R |
| 3,622,992 | 11/1971 | Schoenitz | 340/163 R |
| 3,622,994 | 11/1971 | Schoenitz | 340/163 R |
| 3,626,370 | 12/1971 | Stubbs | 340/163 R |
| 3,644,894 | 2/1972 | McCrea | 340/163 R |
| 3,697,953 | 10/1972 | Schoenwitz | 340/163 R |
| 3,716,096 | 2/1973 | Berrett | 165/22 |
| 3,760,374 | 9/1973 | Nabi | 340/172.5 |
| 3,828,313 | 8/1974 | Schull | 340/163 R |
| 3,845,472 | 10/1974 | Buchanan | 340/147 R |
| 3,854,122 | 12/1974 | Cross | 340/163 R |
| 3,896,871 | 7/1975 | Pecoraro | 165/22 |

*Primary Examiner*—James D. Thomas
*Attorney, Agent, or Firm*—Fitch, Even, Tabin & Luedeka

[57] ABSTRACT

A system for use in supervising and controlling temperature and other environmental conditioning equipment of a building or the like is disclosed. The system monitors and controls various types of sensors and control equipment located at remote field points. The system includes a control console and a number of field located multiplexing modules which are connected to various remote field points. Each of the multiplexing modules is connected to associated field points that are connected to each other and to the multiplexing module in a single leg circuit. The multiplexing modules and control console are also connected together. The multiplexing modules simultaneously and independently poll their associated field points and only communicate with the control console for an alarm special or changed condition. The field points include common field point modules which interface with any of various field point units which comprise sensors or control field point apparatus. The field point modules provide identification signals as well as values measured by the field point units to the multiplexing modules upon command.

32 Claims, 10 Drawing Figures

SUPERVISORY AND CONTROL SYSTEM FOR ENVIRONMENTAL CONDITIONING EQUIPMENT

The present invention generally relates to supervisory and control systems and, more particularly, to systems that are used in association with heating, air conditioning and other environmental control equipment in buildings and the like.

The complexity of the operation of the physical plant equipment in many of the new buildings being constructed, coupled with the high cost of operating personnel, has resulted in a trend toward automatic centralized control of the operation. Since control of the temperature, humidity and the measurements in a large building or plant may necessitate monitoring and controlling literally hundreds of sensing and control devices at locations throughout the building, systems that can automatically monitor and control these field parameters have been the subject of much research and development in recent years. Moreover, because of the large number of measurements and functions that are performed, computer based or computer compatible systems have been the focus of much attention. Such computer controlled automated systems permit a great number of monitoring and operating functions to be controlled from a central console which, when the entire system is working properly, requires only a single operator for controlling a large building having a great number of motors and other control equipment. Such computer based and computer compatible systems can be expanded to include such equipment as alarm writers, logging printers, intercom systems, and the like which enable the systems to provide start/stop functions, motor status summaries, system logs, alarming, status reporting, command control and other indications. Moreover, printouts that provide work orders for maintenance personnel can be automatically printed if a malfunction or breakdown occurs in a piece of equipment and the work order can indicate other periodic maintenance that should be performed in the area once the workman is present at the location. Yet other functions that such systems can provide include programming of start/stop motors, trend recording and audio communication, in addition to building security functions and the optimization of the overall energy efficiency of the building.

While there is little doubt that the use of the computer based or computer compatible systems have been successful in performing these functions and that they permit relatively precise monitoring and control of the operation of the environmental and temperature control equipment, there have been many variations in the scheme utilized. The most prevalent arrangement has a central control console that may include the computer providing the basic or predominate intelligence for the system with all of the field modules and field control points branching away from the central console. The console typically initiates all instructions for requesting status, or issues commands or the like, and the information from the field points is transmitted back to the console. A significant disadvantage of such a system lies in the fact that the console can only engage in a single communication at a time, which may necessitate a lengthy waiting period between status reports of a field point if an extremely large installation is involved.

Perhaps the most significant disadvantage of many prior systems involves the question of system reliability and the fact that when the console breaks down or malfunctions, the entire system is often shut down. Therefore, if there is a serious problem that requires a considerable amount of time to correct or if it is necessary to acquire replacement parts to accomplish the repair of some equipment, the entire system may be out of operation for an extended period of time. Thus, in an extremely large installation, expensive redundant or backup equipment may be necessary.

It is an object of the present invention to provide an improved supervisory and control system for use in temperature and environmental control equipment in buildings and the like which has advantages over such systems as described above and which exhibits improved operational reliability.

Other objects and advantages will become apparent upon reading the following detailed description while referring to the attached drawings, in which.

Figure 1:
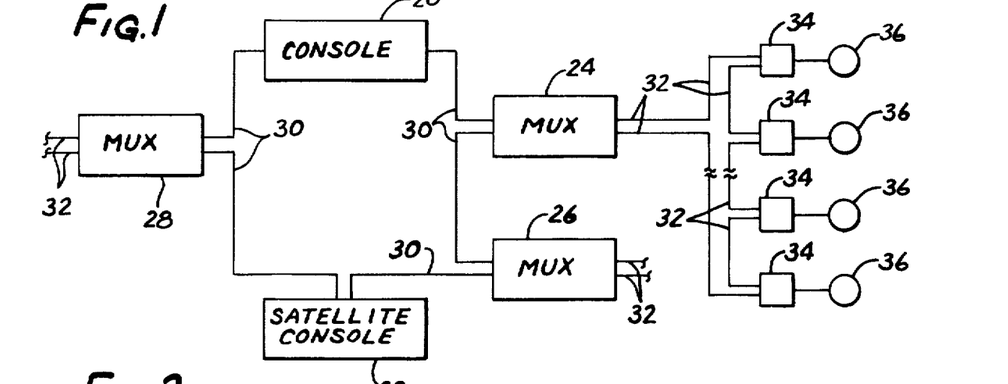
FIG. 1 is a block diagram of a system embodying the present invention.

Turning now to the drawings and particularly to FIG. 1, the system of the present invention will be broadly described with respect to its overall operational capabilities. A central console 20, optional satellite console 22, and multiplexing modules 24, 26 and 28 are connected together as schematically illustrated by the line 30. While three multiplexing modules are specifically illustrated in FIG. 1, the particular installation in which the system is designed may have a greater or lesser number of multiplexing modules than are shown in FIG. 1. Each of the multiplexing modules are shown to have a single leg or run of cable 32 exiting therefrom, with the multiplexing module 24 having the cable 32 connected to field point modules 34, each of which are connected to field point units 36 which may represent a temperature sensor, an on-off contact for a motor controller or the like, a humidity sensor or position indicator for a shaft, valve, and the like. Each of the multiplexing modules, such as the module 24, may accommodate up to 127 separate field point modules 34, each of which will have a field point unit 36 associated with it. Thus, in the event only 127 or fewer units are used in an installation, only one multiplexing module may be required. However, if there are more than 127 field point units in an installation, more than one multiplexing module is necessary and, for every multiple of 127, an additional multiplexing module will be required. For the particular installation shown in FIG. 1, it is therefore apparent that each of the three multiplexing units can have 127 field point units for a maximum total of 381 units that may be incorporated in the system.

In accordance with an important aspect of the present invention, the multiplexing modules are adapted to function independently of one another and independently of the central console 20 or satellite console 22. Each of the multiplexing modules is relatively intelligent in that it includes memory functions and control functions and is adapted to scan the field point modules that are connected to it. The multiplexing modules store the current status and values of the associated field points and also transfer commands from the central console 20 or satellite console to the field point modules. The multiplexing modules may also power for the field point modules and associated point units by virtue of a separate circuit that extends to them. Thus, the number of conductors from the multiplexing modules contained in the cable 32 may be only four, i.e., two power supply lines as well as a transmitting line and a receiving line for data transmission. Even though the multiplexing units are located in the field adjacent the equipment to which the field points are associated, only a single run of four conductor cable is necessary to interconnect a multiplexing module with its associated field point modules. Thus, a single multiconductor cable originating at the multiplexing module can be run from point module to point module. If connected in a loop, the cable would return to multiplexing module to complete the loop. If the point modules are connected in parallel, the cable would not have to return to the multiplexing module from the "last" point module. This is in contrast with many prior systems that require a separate circuit from each field point to a field located cabinet. The system embodying the present invention may substantially reduce the field electrical installation, with respect to both material and labor costs. As previously mentioned, the multiplexing modules are also connected together and, accordingly, the cable between the console 20 and the multiplexing modules similarly interconnects the console, the satellite console and all multiplexing modules. While each of the field point modules 34 are schematically shown to be separate from one another, it should be understood that they may be housed in a single enclosure in the event that the field point units 36 associated with the field point modules are in close proximity to one another.

Figure 2:
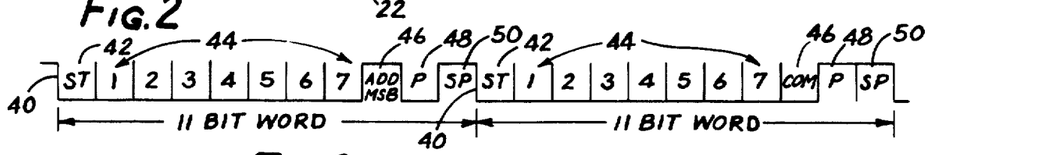
FIG. 2 is a timing diagram showing the basic structure of the data words used between the multiplexing modules and the field point modules in the system of the present invention.

Prior to describing the individual components and the general operation of the multiplexing modules 24, as well as the field point modules 34, the basic data transmission scheme that is preferred to communicate between the various modules will be described in connection with the timing diagram shown in FIG. 2. The basic format includes 11-bit words which are transmitted and received by the various modules within the system. As is shown in FIG. 2, the first negative-going edge 40 starts the 11-bit word and the first bit is a start bit 42 followed by 7 data bits 44, a steering bit 46, a parity bit 48 and a stop bit 50. The steering bit 46 is the most significant bit since it determines whether the word is an address or command. The steering bit may be either high or low, with a high steering bit 46 designating an address as shown in the left 11-bit word and designating a command if it is low, as shown in the right 11-bit word. The parity bit 48 is selected to be even parity in that it counts the number of positive or high bits that are contained in the particular word and, if the number is an odd number, a high bit is used for the parity bit 48. However, if it is an even number up to the time of the parity bit, the parity bit will be low so that there will always be an even number of high bits in any 11-bit word. Once the stop bit is reached, the module receiving the address or command stops and waits for the next negative-going edge 40 which starts the sequence over again in the manner previously described. The stop bit is high regardless of whether the word is an address or a command.

Within each of the bits of the word are a number of clock pulses or time slots. Thus, the data rate is preferably of longer time duration than the frequency of the clock that is used in the field point modules as well as the multiplexing modules. For example, the data rate of the bits is preferably about one sixteenth of the clock frequency so that start pulse 42 and each of the data bits 44 as well as the steering bit 46 preferably contains sixteen pulses or time slots. Thus, for example, if a clock is used having a clock frequency of 19,200 Hertz, the data rate that would be transmitted in the timing diagram shown in FIG. 2 would be one sixteenth of that or about 1,200 Baud. Of course, it should be understood that the data rate may be higher or lower than 1,200 Baud.

The digital data transmitted between the console 20 and the multiplexing modules on a two wire data line is accomplished by means of frequency modulation, i.e. $f_1$ for logical 0 and $f_2$ for a logical 1, using a modulator-demodulator at each location. To transmit data from the console 20 to a multiplexing module the console modulator-demodulator takes the 16 bit binary word and transmits an FM signal to the multiplexing modules. This signal consists of a number of cycles of the two frequencies used in an arrangement consisting of three high frequency cycles for a leader, one low frequency cycle for a mark, 16 cycles of the appropriate frequencies for the data (low frequency for logical 0, high frequency for logical 1), 16 cycles of the appropriate frequencies for the second data word which is the data word inverted (high frequency for logical 0, low frequency for logical 1), and 4 high frequency cycles for a trailer. The multiplexing module demodulates the signal in the following way: the three high frequency cycles are used to detect a carrier signal and initialize the modulator-demodulator to receive data, the low frequency cycle signals the beginning of the data word, the two words are compared bit by bit and if the two words do not agree the data is rejected, the 4 trailer cycles identify the transmission as one coming from the console 20. If a transmission comes from a multiplexing module, it has the same format except that it has a 12 cycle trailer.

Figure 3:
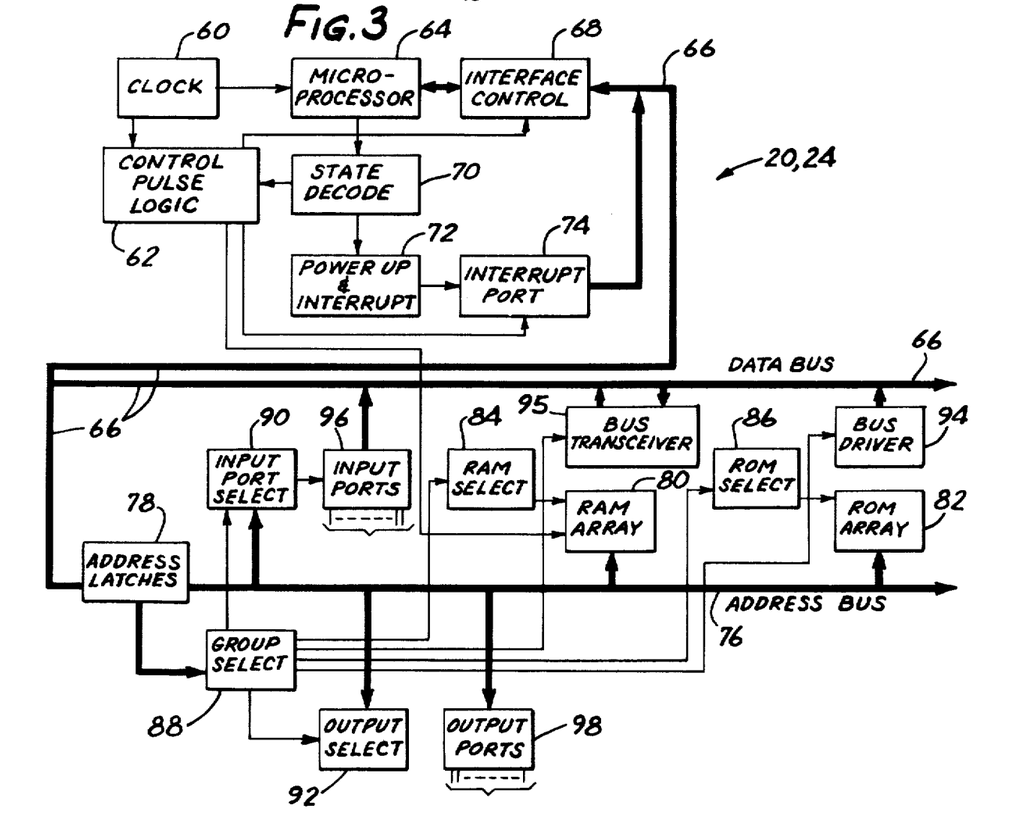
FIG. 3 is a block diagram of the console and multiplexing modules used in the present invention.

Turning now to the block diagram shown in FIG. 3 which is representative of the console 20 as well as each of the multiplexing modules, such as module 24 for example, a clock 60 provides the basic operating frequency for the system and is used to drive a control pulse logic circuit 62 as well as a micro-processor 64. The micro-processor 64 is connected to a data bus through an interface control 68 which is controlled by the control pulse logic 62. A state decode circuit 70 controls the control logic 62 and also controls power up and interrupt circuitry which is used to condition the module upon turn on, or if normal operation is interrupted. Thus, the state decode circuit 70 can force the power up and interrupt circuitry 72 on to the data bus 66 through an interrupt port 74 to initialize the module and get it running. In this regard, the power up and interrupt circuitry preferably includes a micro-processor that is programmed with the instructions for executing sequential operations for restarting or initializing the apparatus. The data bus 66 is also connected to an address bus 76 through an address latching circuit 78. Thus, the micro-processor 64 may receive data from the data bus 66 and also transmit addresses through the address bus 76 and data bus 66. The modules shown in FIG. 3 have an array of random access memories (RAM) shown by the block designated as 80 as well as array of read-only memories (ROM) shown by the block 82. The particular RAM that is to be located in the array 80 is selected by RAM select circuitry 84 and ROM select circuitry 86 identifies the particular ROM in the ROM array 82. A group select logic circuit 88 selectively controls an input port select circuit 90, an output select circuit 92, as well as the RAM and ROM select circuits 84 and 86, a bus driver 94 and bus transceiver 95. The input port select circuitry 90 identifies and operably connects the various input ports 96 to the data bus 66 and the output select circuit 92 activates the particular output ports 98 for issuing addresses.

The data bus 66 has bidirectional data flow in that addresses are sent out over the address bus and data is also received through the data bus with the direction being controlled by the interface control circuit 68 which generally comprises a number of bidirectional gates. Thus, the gates selectively isolate the microprocessor 64 from the bidirectional bus 66 as is desired.

The state decode circuit 70 generates the basic machine cycle timing for the entire multiplexing and console modules. The basic machine cycle includes 5 time frames T1 through T5, with T1 and T2 being used to "fetch" instructions, T3 for decoding the instructions, and T4 and T5 for executing the instructions. In the event an operation requires additional instructions, a second or additional machine cycle is used.

Figure 7:
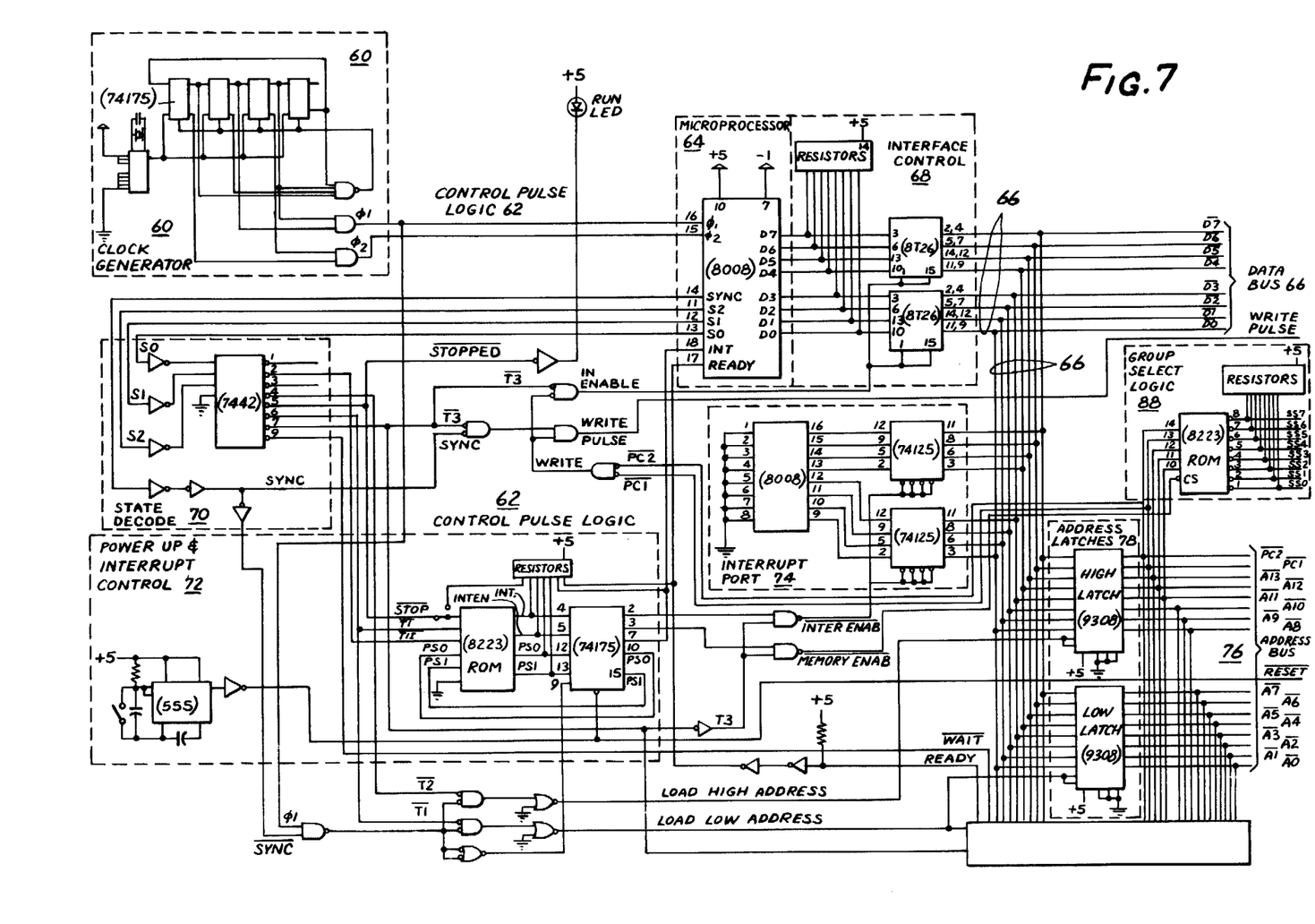
FIGS. 7-10 comprise the electrical circuit diagrams of the multiplexing units and console shown in the block diagram of FIG. 3.
Figure 8:
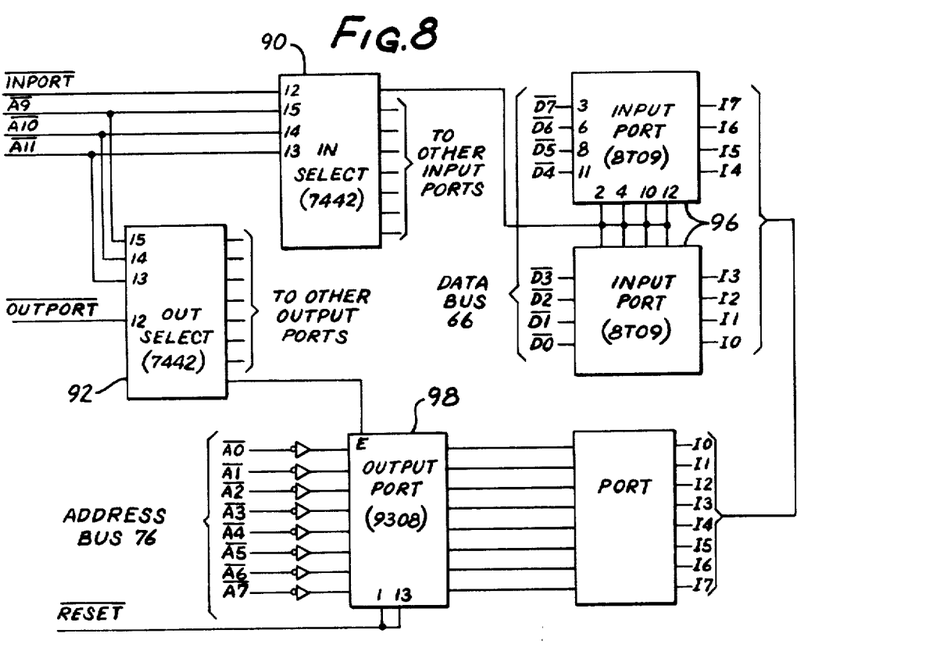
Figure 9:
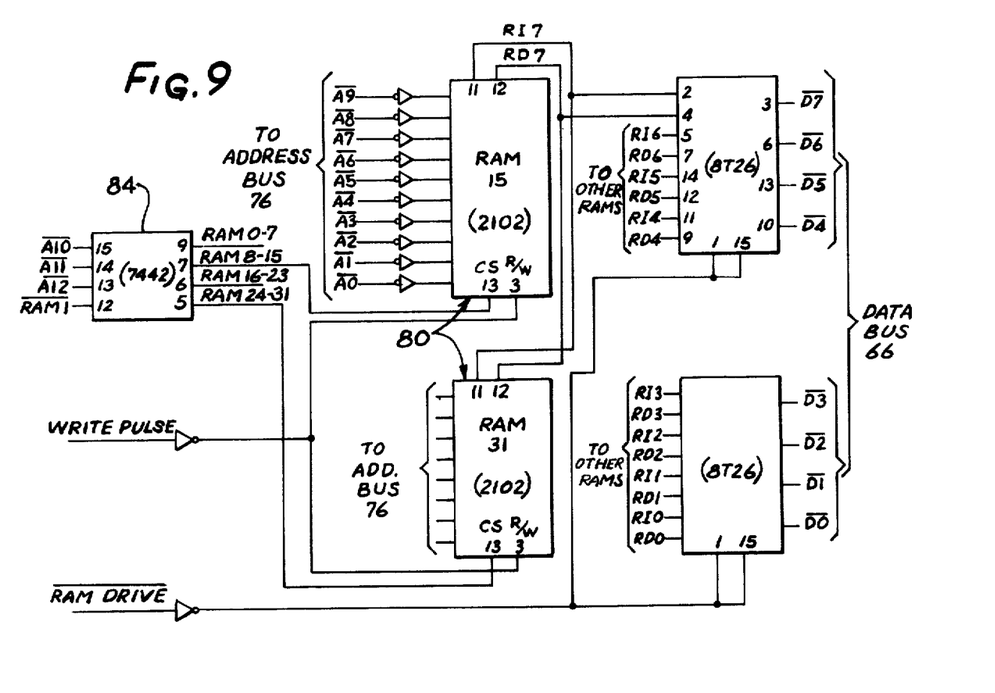

The coding for the read-only memory in the group select logic circuit 88 which is permanently programmed by being "burned in" is shown in Table 1 below and the table for the read-only memory utilized in the power-up and interrupt circuitry 72 is similarly shown in Table 2. The specific circuitry associated with the block diagram of FIG. 3 is shown in detail in FIGS. 7–10. The greatest portion of the circuitry is shown in FIG. 7, including the clock generator 60, control pulse logic 62, the micro-processor 64, the state decode circuitry 70, the interface control circuitry 68, the power-up and interrupt control circuitry 72, the interrupt ports 74, the group select logic 88 and address latches 78. The input port and output select circuits 90 and 92 are shown in FIG. 8 and arrays of random access memories and read-only memories in FIGS. 9 and 10, respectively. It should be apparent upon viewing FIGS. 9 and 10 that only representative memories are illustrated and that the array may include many more memories than are specifically shown. The drawings are intended to show the manner in which the memories are connected. In FIG. 9, for example, only two random access memories (numbers 15 and 31) are shown, but the drawing indicates the manner in which many random access memories are connected in the array.

TABLE 1

| OCTAL ADDRESS | BINARY ADDRESS | | | | | GROUP SELECT ROM CODING OUTPUT SIGNALS | | | | | | | |
|---|---|---|---|---|---|---|---|---|---|---|---|---|---|
| | $\overline{PC2}$ | $\overline{PC1}$ | A13 | A12 | A11 | SS7 | SS6 | SS6 | SS4 | SS3 | SS2 | SS1 | SS0 |
| 0 0 | 0 | 0 | 0 | 0 | 0 | 1 | 1 | 1 | 1 | 1 | 1 | 1 | 1 |
| 0 1 | 0 | 0 | 0 | 0 | 1 | 1 | 1 | 1 | 1 | 1 | 1 | 1 | 1 |
| 0 2 | 0 | 0 | 0 | 1 | 0 | 1 | 1 | 0 | 1 | 1 | 1 | 1 | 1 |
| 0 3 | 0 | 0 | 0 | 1 | 1 | 1 | 1 | 0 | 1 | 1 | 1 | 1 | 1 |
| 0 4 | 0 | 0 | 1 | 0 | 0 | 1 | 1 | 1 | 1 | 1 | 1 | 1 | 1 |
| 0 5 | 0 | 0 | 1 | 0 | 1 | 1 | 1 | 1 | 1 | 1 | 1 | 1 | 1 |
| 0 6 | 0 | 0 | 1 | 1 | 0 | 1 | 1 | 1 | 1 | 1 | 1 | 1 | 1 |
| 0 7 | 0 | 0 | 1 | 1 | 1 | 1 | 1 | 1 | 1 | 1 | 1 | 1 | 1 |
| 1 0 | 0 | 1 | 0 | 0 | 0 | 1 | 1 | 1 | 1 | 1 | 1 | 1 | 1 |
| 1 1 | 0 | 1 | 0 | 0 | 1 | 1 | 1 | 1 | 1 | 1 | 1 | 1 | 1 |
| 1 2 | 0 | 1 | 0 | 1 | 0 | 1 | 1 | 0 | 1 | 1 | 0 | 1 | 1 |
| 1 3 | 0 | 1 | 0 | 1 | 1 | 1 | 1 | 0 | 1 | 1 | 0 | 1 | 1 |
| 1 4 | 0 | 1 | 1 | 0 | 0 | 1 | 1 | 1 | 1 | 1 | 1 | 1 | 1 |
| 1 5 | 0 | 1 | 1 | 0 | 1 | 1 | 1 | 1 | 1 | 1 | 1 | 1 | 1 |
| 1 6 | 0 | 1 | 1 | 1 | 0 | 1 | 0 | 1 | 1 | 1 | 1 | 0 | 1 |
| 1 7 | 0 | 1 | 1 | 1 | 1 | 0 | 1 | 1 | 1 | 1 | 1 | 0 | 1 |
| 2 0 | 1 | 0 | 0 | 0 | 0 | 1 | 1 | 1 | 1 | 1 | 1 | 1 | 1 |
| 2 1 | 1 | 0 | 0 | 0 | 1 | 1 | 1 | 1 | 1 | 1 | 1 | 1 | 1 |
| 2 2 | 1 | 0 | 0 | 1 | 0 | 1 | 1 | 1 | 1 | 1 | 1 | 1 | 1 |
| 2 3 | 1 | 0 | 0 | 1 | 1 | 1 | 1 | 1 | 1 | 1 | 1 | 1 | 1 |
| 2 4 | 1 | 0 | 1 | 0 | 0 | 1 | 1 | 1 | 1 | 0 | 1 | 1 | 1 |
| 2 5 | 1 | 0 | 1 | 0 | 1 | 1 | 1 | 1 | 1 | 0 | 1 | 1 | 1 |
| 2 6 | 1 | 0 | 1 | 1 | 0 | 1 | 1 | 1 | 0 | 1 | 1 | 1 | 1 |
| 2 7 | 1 | 0 | 1 | 1 | 1 | 1 | 1 | 1 | 0 | 1 | 1 | 1 | 1 |
| 3 0 | 1 | 1 | 0 | 0 | 0 | 1 | 1 | 1 | 1 | 1 | 1 | 1 | 0 |
| 3 1 | 1 | 1 | 0 | 0 | 1 | 1 | 1 | 1 | 1 | 1 | 1 | 1 | 0 |
| 3 2 | 1 | 1 | 0 | 1 | 0 | 1 | 1 | 0 | 1 | 1 | 0 | 1 | 0 |
| 3 3 | 1 | 1 | 0 | 1 | 1 | 1 | 1 | 0 | 1 | 1 | 0 | 1 | 0 |
| 3 4 | 1 | 1 | 1 | 0 | 0 | 1 | 1 | 1 | 1 | 1 | 1 | 1 | 0 |
| 3 5 | 1 | 1 | 1 | 0 | 1 | 1 | 1 | 1 | 1 | 1 | 1 | 1 | 0 |
| 3 6 | 1 | 1 | 1 | 1 | 0 | 1 | 0 | 1 | 1 | 1 | 1 | 0 | 0 |
| 3 7 | 1 | 1 | 1 | 1 | 1 | 0 | 1 | 1 | 1 | 1 | 1 | 0 | 0 |

SS7 = $\overline{ROM1}$
SS6 = $\overline{ROM2}$
SS5 = $\overline{RAM1}$
SS4 = $\overline{INPORT}$
SS3 = $\overline{OUTPORT}$
SS2 = $\overline{RAM\ DRIVE}$
SS1 = $\overline{ROM\ DRIVE}$
SS0 = $\overline{FETCH}$

TABLE 2

POWER UP & INTERRUPT ROM CODING

| OCTAL ADDRESS | BINARY ADDRESS | | | | | OUTPUT SIGNALS | | | |
|---|---|---|---|---|---|---|---|---|---|
| | PSI | PSO | TII | TI | STOP | PS1 | PSO | INT. | INT.EN |
| 0 0 | 0 | 0 | 0 | 0 | 0 | 0 | 1 | 1 | 0 |
| 0 1 | 0 | 0 | 0 | 0 | 1 | 0 | 1 | 1 | 0 |
| 0 2 | 0 | 0 | 0 | 1 | 0 | 0 | 1 | 1 | 0 |
| 0 3 | 0 | 0 | 0 | 1 | 1 | 0 | 1 | 1 | 0 |
| 0 4 | 0 | 0 | 1 | 0 | 0 | 0 | 1 | 1 | 0 |
| 0 5 | 0 | 0 | 1 | 0 | 1 | 0 | 1 | 1 | 0 |
| 0 6 | 0 | 0 | 1 | 1 | 0 | 0 | 1 | 1 | 0 |
| 0 7 | 0 | 0 | 1 | 1 | 1 | 0 | 1 | 1 | 0 |
| 1 0 | 0 | 1 | 0 | 0 | 0 | 1 | 1 | 0 | 1 |
| 1 1 | 0 | 1 | 0 | 0 | 1 | 1 | 1 | 0 | 1 |
| 1 2 | 0 | 1 | 0 | 1 | 0 | 1 | 1 | 0 | 1 |
| 1 3 | 0 | 1 | 0 | 1 | 1 | 1 | 1 | 0 | 1 |
| 1 4 | 0 | 1 | 1 | 0 | 0 | 0 | 1 | 1 | 0 |
| 1 5 | 0 | 1 | 1 | 0 | 1 | 0 | 1 | 1 | 0 |
| 1 6 | 0 | 1 | 1 | 1 | 0 | 0 | 1 | 1 | 0 |
| 1 7 | 0 | 1 | 1 | 1 | 1 | 0 | 1 | 1 | 0 |
| 2 0 | 1 | 0 | 0 | 0 | 0 | 0 | 0 | 0 | 0 |
| 2 1 | 1 | 0 | 0 | 0 | 1 | 1 | 0 | 0 | 0 |
| 2 2 | 1 | 0 | 0 | 1 | 0 | 0 | 0 | 0 | 0 |
| 2 3 | 1 | 0 | 0 | 1 | 1 | 1 | 0 | 0 | 0 |
| 2 4 | 1 | 0 | 1 | 0 | 0 | 0 | 0 | 0 | 0 |
| 2 5 | 1 | 0 | 1 | 0 | 1 | 1 | 0 | 0 | 0 |
| 2 6 | 1 | 0 | 1 | 1 | 0 | 0 | 0 | 0 | 0 |
| 2 7 | 1 | 0 | 1 | 1 | 1 | 1 | 0 | 0 | 0 |
| 3 0 | 1 | 1 | 0 | 0 | 0 | 1 | 0 | 0 | 0 |
| 3 1 | 1 | 1 | 0 | 0 | 1 | 1 | 0 | 0 | 0 |
| 3 2 | 1 | 1 | 0 | 1 | 0 | 1 | 1 | 0 | 1 |
| 3 3 | 1 | 1 | 0 | 1 | 1 | 1 | 1 | 0 | 1 |
| 3 4 | 1 | 1 | 1 | 0 | 0 | 1 | 0 | 0 | 0 |
| 3 5 | 1 | 1 | 1 | 0 | 1 | 1 | 0 | 0 | 0 |
| 3 6 | 1 | 1 | 1 | 1 | 0 | 1 | 1 | 0 | 1 |
| 3 7 | 1 | 1 | 1 | 1 | 1 | 1 | 1 | 0 | 1 |

Figure 10:
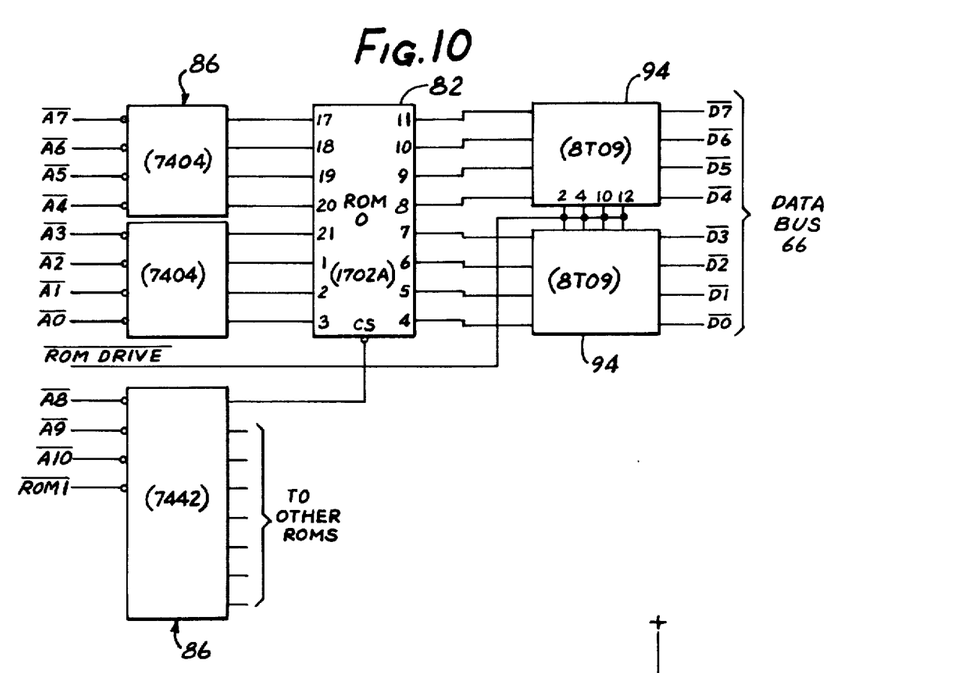

Similarly, the circuits in FIG. 10 with respect to the array of read-only memories shows the single representative read-only memory, identified as ROM-0, even though the specific circuitry shown is adapted to control up to 15 separate read-only memories.

The specific circuitry shown in FIGS. 7-10 carry the designator numbers of the blocks that have been described with respect to the block diagram of FIG. 3 and the blocks are enclosed in dotted lines where applicable. In addition to the common designator numbers, the description of the block diagrams are also included, as are the descriptions of the signals that are produced by the circuitry. Moreover, the standard industry numbers of the components are shown in parenthesis within the blocks and pin numbers are included where possible. These numbers are standard components and integrated circuits and are well known to those skilled in the art. The micro-processor chips are model No. 8008 manufactured by the Intel Corporation of Santa Clara, Calif. The detailed schematic diagrams and operational characteristics of the micro-processor chip contained in the MCS-8 Microcomputer set, 8008 Users Manual dated November 1973, Revision 4 are incorporated by reference herein.

Figure 4:
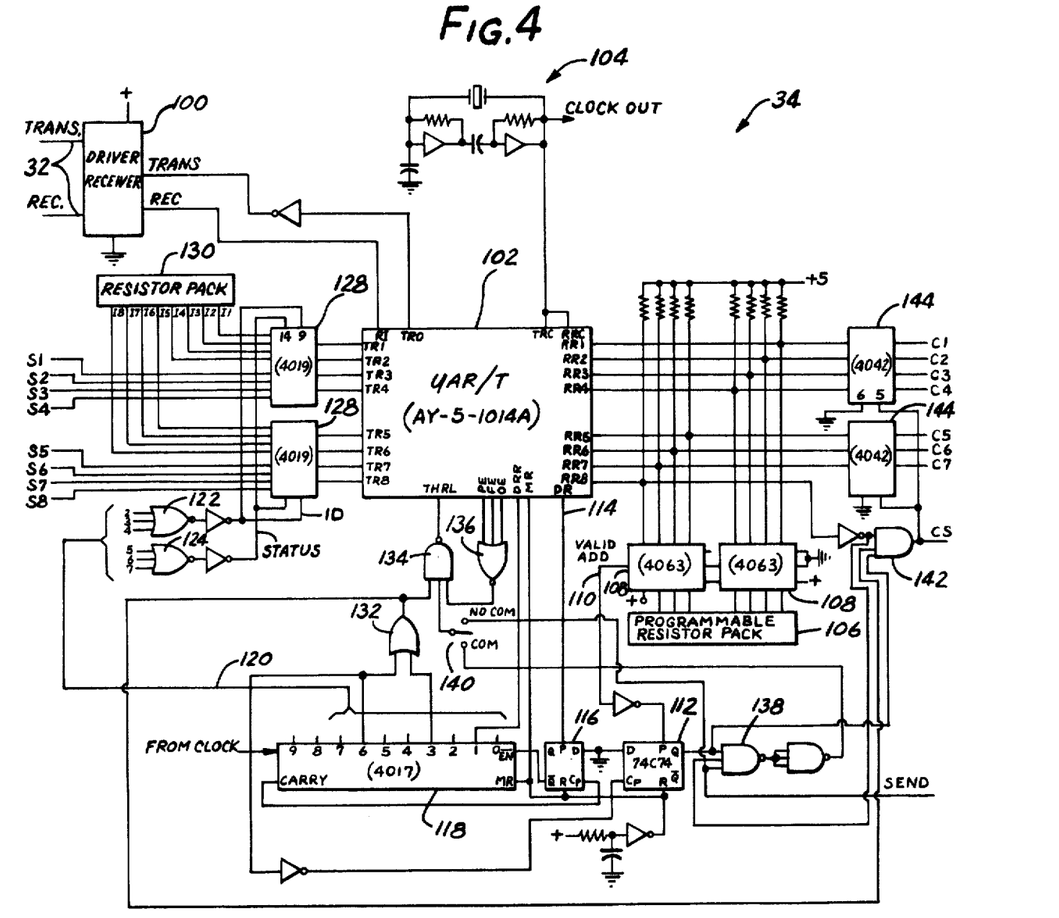
FIG. 4 is a schematic diagram of a field point module used in the present invention.

In accordance with another aspect of the present invention and referring to FIG. 4, the electrical schematic diagram is shown for a typical field point module 34 to which the field point unit 36 are connected. As will be hereinafter described, the field point module 34 is adapted to interface the individual units regardless of the type or kind of parameter that is being controlled or monitored. An advantage of the uniform design for the field point modules 34 is that they can be produced in large quantities which enables the cost per unit to be reasonable, even though there are a large number of circuit components and many functions are performed therein. More specifically, the field point modules are adapted to be connected to various types of field point units such as various sensors having differing ranges used in measuring temperatures, pressures and other variables. The analog signals are converted to digital form for transmission from the field point module 34 to the multiplexing modules and the consoles. Additionally, basic binary sensors can also be used for generating start/stop, mode and contact alarm signals and for controlling two-speed motors, for example. The field point module 34 can also interface with a basic control point adjustment module for controlling the position of a damper, shaft or other controlled variable positioning device.

Referring again to FIG. 4, the field point module 34 is connected to its associated multiplexing module by the lines 32, in addition to two power supply lines which are not shown. Thus, the upper of the two lines is shown to transmit data while the lower line is indicated to be the line on which an address, command and other data is received. The lines 32 are connected to a driver-receiver circuit 100 which is connected to a universal asynchronous receiver/transmitter, hereinafter often referred to as a "UART", which is preferably an n-channel UART model number AV-5-1014A manufactured by General Instrument Corporation of Hicksville, N.Y. The UART is driven by an oscillator 104 which has an output frequency that is compatible with the frequency of the clock 60 in the multiplexing modules. Thus, the oscillator 104 will have a frequency that is preferably sixteen times the data rate, so that if the data rate is 1,200 Baud, then the clock frequency is preferably about 19,200 Hertz. However, the oscillator may utilize a higher frequency crystal which may require the oscillator output to be reduced by using frequency dividers, for example.

If the multiplexing module addresses the particular field point module 34, the 11-bit word is sent where it is received by all of the field point modules through the receive line which is fed into the RI input of the UART 102. It is pointed out that the bits of the words shown in FIG. 2 are inverted while the word is transmitted between the multiplexing module and the field point module and are again inverted by the modules during the internal processing. The UART includes holding registers that hold the word until the steering bit which is determined to be the most significant bit (MSB) is received and appears on terminal RR8. Thus, the first word containing bits 1 through 7 and the steering bit 46 as shown in FIG. 2, appear on the pins RR1 through RR8 and the pin RR8 determines whether it is an address or a command. As previously mentioned, an address steering bit 46 is high and a command steering bit is low. The address that is received by the field point module is internally compared with a programmed address that is unique to the particular module to determine if the field point unit addressed for the purpose of carrying out a command or determining a status condition is the correct field point unit. Each field point module has a programmable pack 106 which is preferably of the type which has a number of switches or it may be of the type that has links which may be cut to uniquely identify each field point module. A pair of comparators 108 compare the outputs RR1 through RR8 with a positive voltage on the seven output pins of the programmable resistor pack 106 so that if the comparison is identical, then the comparators 108 generate a valid address pulse on line 110 which sets a flip flop 112.

It should be understood that no valid address pulse will be produced if the most significant bit appearing on pin RR8 of the UART is low, for the reason that the low pulse will not compare with the positive voltage or high pulse that is always present on the leftward pin of the comparator 108. The flip flop 112 and the output therefrom is used as the conditioning pulse to receive another 11-bit command word in the module. The logic of the point module uses the valid address pulse to indicate that another word is to be received and, if it is a command word, it can be processed. Unless the flip flop 112 is set, there can be no transmission back from the point module 34. If the next word received is a command, the DR line 114 becomes positive which sets a flip flop 116, and its output enables a counter 118 which is clocked by the oscillator 104. The counter 118 has time slots which are numbered 0 through 9 as shown and which are connected by lines 120 to similarly numbered pins of OR gates 122 and 124 as shown. Thus, when flip flop 116 sets the counter 118, the numbered pins sequentially go high at a frequency determined by the clock frequency of the oscillator 104. The 0 time slot or count of the counter is not used, but the first count indicated at pin 1 energizes a data received reset line (DRR). The time slots 2, 3 and 4 are used for the transmission cycle of the UART 102 to transmit the identification code of the point module back to the multiplexing module. Similarly, time slots 5, 6, and 7 are reserved for transmission of status to the multiplexing modules. The time slots 2 through 7 are connected by lines 120 to the OR gate 122 and 124, which control the identification and status modes, respectively, of a pair of selectors 128 which place either the identification or status signals at the inputs TR1 through TR8 of the UART 102. Thus, when the time slots 2–4 are high, the selectors 128 will connect the UART to a programmable resistor pack 130 that can be programmed to supply a unique identification code for each field point module 34.

After the identification code is transmitted, the counter 118 progresses to the time slots 5, 6, and 7 for transmitting the status signals and OR gate 124 switches selectors 128 to connect the status lines S1 through S8 on to the pins TR1 through TR8 of the UART 102. The counter 118 also has the time slot pins 3 and 6 connected to an OR gate 132 the output of which is connected to NAND gate 134. Other inputs to the NAND gate 134 are supplied by NOR gate 136 which goes low if a parity error, framing error, or overrun error is produced. The third input to the NAND gate 134 is supplied by either a valid address pulse or from a NAND gate 138 which provides a true output if a valid address pulse and a send pulse are received. Thus, a switch 140 is used to directly supply a valid address pulse when it is switched to its upward position where there is no command used, as might be the case for a supervised contact or the like for which there is nothing to command. When the switch 140 is in the lower position, the command bit is used to effectively start the transmission of the identification followed by the status. The output of the NAND gate 134 controls the transmitter holding register load pin which internally causes the data to be serially shifted out on the transmit output pin (TRO).

If a command is to be issued to the field point unit 36 that is controlled by the module 34, it is sent out during time slot 3 by virtue of a NAND gate 142 that issues the command strobe pulse CS. Since the other input of the NAND gate 142 is supplied by the pin RR8, a low command steering bit pulse is necessary in the 11-bit word (see FIG. 2) so that during time slot 3 of the counter 118, the command strobe will be energized which will result in the send pulse being applied to the NAND gate 138.

As previously mentioned, the field point module 34 is utilized with all types of status reporting and monitoring that is done by the particular sensors or control devices used in the field point unit 36. The multiplexing modules transmit the identification to the field point modules followed by an instruction and each of the field point modules 34 internally compares the address sent with their own internally programmed address to determine which of the modules is being addressed, and if the comparison is identical and no other transmission errors are detected, the field point module 34 will transmit the command out on the command lines C1 through C7. Latching circuits 144 are included in the output C1–C8 to memorize information and is sent out at the issuance of the CS pulse. The latches are particularly useful for control point adjustment and start-stop type of field points. Similarly, if status is requested, the field point module will transmit the identification code onto the line, followed by the status information that is contained on line S1 through S8.

Figure 5:
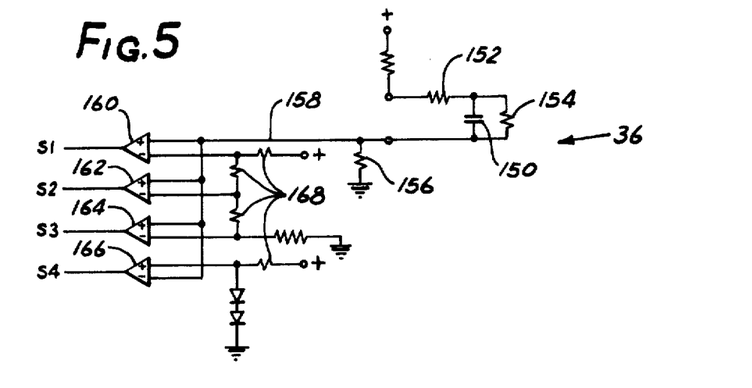
FIG. 5 is an electrical circuit diagram of a supervised contact field point for use with a field point module.

As an example, and referring to FIG. 5, there is shown a circuit for connection to the field point module where the field point unit 36 is intended to monitor the status of an electrical contact. Thus, in this instance the field point unit 36 uses only four of the status lines S1–S4 to provide all of the necessary digital information regarding a contact 150 that is being monitored. The supervised contact circuit shown in FIG. 5 has a resistor 152 connected in series with a positive voltage source, for example 15 volts, and a resistor 154 is connected in parallel with the contact 150. The contact and resistor 154 are connected to ground through a resistor 156 and line 158 connects contact 150 and resistors 154 and 156 to a number of comparators 160, 162, 164 and 166. Each of the comparators are adapted to provide a positive output in the event that the voltage on the positive input exceeds the voltage in the other input.

The resistors 168 are connected to a positive voltage source and merely define a ladder arrangement which places different reference voltages to the various comparators. Thus, comparator 160 may require a voltage of about 11 volts to go positive while comparator 162 may only require about 8 volts and comparator 164 only about 5 volts. The resistors 152, 154, and 156 define voltage dividers depending upon the condition of the contact 150 and the magnitude of the voltage in the line 158 will effectively define the state of the contact. If the line is shorted, 11 volts would be present on line 158 so that comparator outputs S1–S3 would be high and only output S4 would be low. If the contact 150 is closed, then about 8 volts would appear and only outputs S2 and S3 would be high. In the event contact 150 is open, then about 5 volts would be present on line 158 and only output S3 would be high, and if the line 158 is open circuited, then only S4 would be high. From the foregoing description, it can be seen that the four status lines S1–S4 can effectively monitor the operation and condition of a contact and also determine if an open or short circuit exists.

Figure 6:
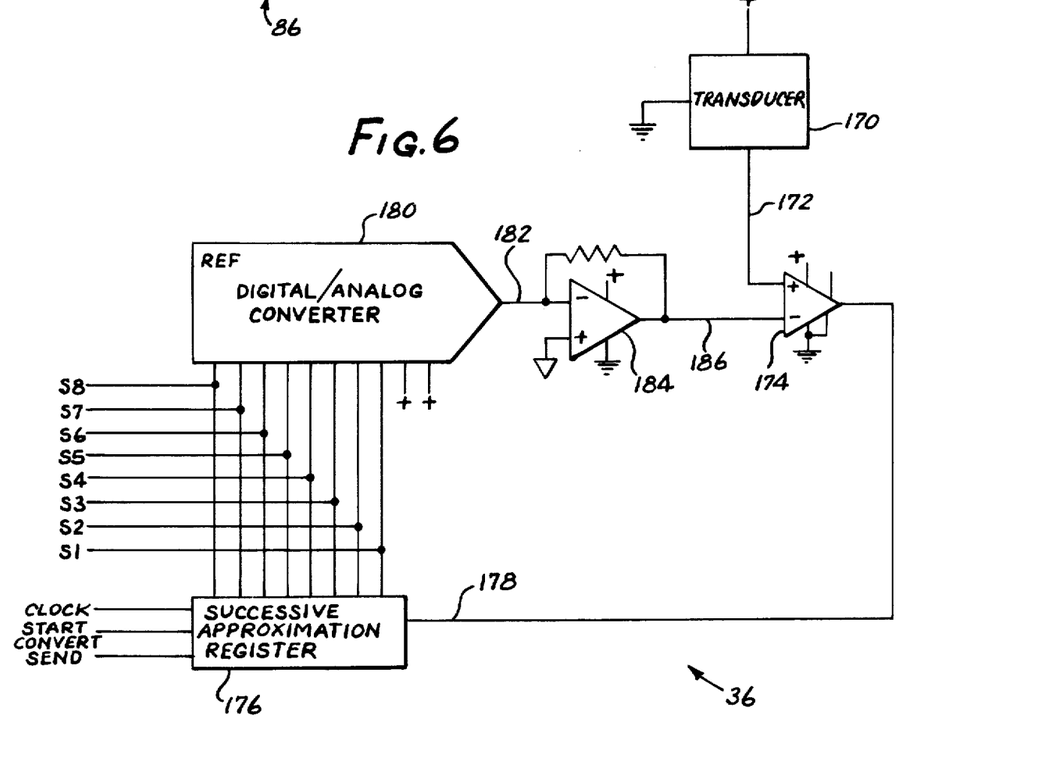
FIG. 6 is an electrical circuit of an analog-to-digital conversion field point for use with a field point module.

In addition to the above described supervised contact arrangement, temperature and pressure measurements and the like are often required to be supervised and controlled and such analog or continuously variable parameters must be effectively converted to a digital format for transmission from the field point module to the multiplexing module. Accordingly, referring to the analog to digital sensing circuit of FIG. 6, a pressure transducer 170 is adapted to provide a range of voltages that is directly proportional to the range of pressures that the transducer is measuring. Thus, the voltage range may vary, for example, between 2.5 and 12.5 volts, although other voltage ranges may be used depending upon the particular transducer that is used. The voltage appears on line 172 which is one input of a voltage comparator 174, the output of which is applied to the data input of a successive approximation register 176 through line 178. The successive approximation register 176 has eight output pins which are connected to the status lines S1–S8 as well as to eight separate pins of a digital-analog converter 180 which generally comprises a binary divider and converts the successive approximation register output to a current in line 182. The most significant digit is the leftmost pin S8 and the resolution of the converter is such that the least significant digit S1 is 1/256th of the full scale current. The current in line 182 is converted by a voltage converter 184 into a voltage range that is compatible to the voltage range supplied by the transducer 170. Thus, the converter 184 preferably supplies a voltage within the range of 2.5 to 12.5 in direct proportion to the output current in line 182 of the digital-analog converter 180. The output of the converter 184 is applied to the comparator 174 through line 186. The circuit shown in FIG. 6 effectively supplies a digital status signal on lines S1–S8 that indicates the value of the pressure measured by the transducer and the field point module communicates this status information to the multiplexing module to which it is operably associated.

From the foregoing description, it should be understood that an improved system has been described which greatly increases the reliability over computer-based systems, for the reason that each of the multiplexing modules can independently and simultaneously monitor and control the field point modules that are associated with it. The system has enhanced reliability for the reason that the single control console does not perform all of the functions as has been typically done in the past. Since the multiplexing modules can operate independently of one another and can simultaneously poll the field point modules that are connected thereto, a failure of a single multiplexing module does not affect the operation of the other multiplexing modules within the system and a failure of a single point module only affects that point module.

It is of course understood that although preferred embodiments of the present invention have been illustrated and described, various modifications thereof will become apparent to those skilled in the art and, accordingly, the scope of the present invention should be defined only by the appended claims and equivalents thereof.

Various features of the invention are set forth in the following claims.

What is claimed is:

1. A system for monitoring and controlling a plurality of field points associated with environmental and temperature control equipment in a building or the like, comprising:

two or more multiplexing modules for sequentially polling field point modules that are connected thereto by transmitting various unique address signals to field point modules operably connected therewith and receiving identification and status signals therefrom, each of said multiplexing modules selectively issuing command signals for operating and adjusting control equipment associated with a field point, each said multiplexing modules simultaneously and independently performing said polling, receiving and issuing operations with respect to the field point modules connected thereto;

each multiplexing module having one or more field point modules connected thereto, each of which receives said address signals and recognizes its unique address signals identifying the same, each field point module transmitting identification and status signals of an associated field point unit to its associated multiplexing module in response to receiving and recognizing its address signals, said field point modules also receiving and forwarding said command signals to certain associated field point units for commanding the environmental and temperature control equipment to carry out selected operations and adjustments;

a field point unit operatively connected to each field point module, said field point unit producing electrical signals that are indicative of the status of a parameter relating to the environmental and temperature control equipment or an environmental and temperature condition, certain of said field point units being adapted to implement received command signals for effecting a control equipment adjustment and the like.

2. A system as defined in claim 1 further including console means for communicating with all of said multiplexing modules and for receiving information that is indicative of alarm, out of tolerance and other conditions being measured at the field points.

3. A system as defined in claim 1 wherein each of said multiplexing modules includes means for sequentially polling individual field point modules associated with each field point to gather the data relating to the field point being monitored and controlled, said multiplexing module selectively transmitting address signals to all of said field point modules connected thereto, said multiplexing module receiving said status information from said field point module together with a unique identification code associated therewith.

4. A system as defined in claim 1 wherein said status, address, identification and command signals are transmitted in multi-bit words of predetermined length.

5. A system as defined in claim 4 wherein each of said multi-bit words has eleven bits, including a start bit, information bits, a command or address indicative steering bit, a parity bit and stop bit.

6. A system as defined in claim 4 wherein each of said multiplexing modules transmit two multibit words wherein the initial word includes the address information of the particular field point module being polled followed by a command word.

7. A system as defined in claim 1 wherein each of said field point modules has a plurality of status lines for connection to status output lines of a field point unit to which the module is connected so that status information is received by said field point module for subsequent transmission to the multiplexing module to which the field point module is connected.

8. A system as defined in claim 7 wherein said field point modules have eight status lines to which said field point units can be connected.

9. A system as defined in claim 7 wherein each of said field point modules has a plurality of command lines for connection to command lines of a field point unit that is adapted to receive command signals for effecting the operation thereof.

10. A system as defined in claim 9 wherein said field point modules include seven command lines.

11. A system as defined in claim 7 wherein each of said field point modules includes means for recognizing its unique address code and for issuing an internal valid address signal in the event that its unique address is recognized.

12. A system as defined in claim 11 wherein said means for recognizing said address comprises means for comparing an internally generated address signal with the received address signal and issuing said valid address signal in the event the comparison is identical.

13. A system as defined in claim 11 wherein each of said field point modules includes means for generating unique identification signals for use in transmitting the identity of the particular field point module to the multiplexing module.

14. A system as defined in claim 13 wherein said field point module includes timing means for effecting forwarding of the unique field point module identification signals and the status signals to said multiplexing module in response to the receipt of said valid address signal.

15. A system as defined in claim 14 wherein said field point modules further include selector means for initially connecting means for generating said unique identification code signals for transmission by said field point module, and for subsequently connecting said status lines for transmitting said status information to said associated multiplexing module, said selector means being operably connected to said timing means and controlled thereby.

16. A system as defined in claim 13 wherein said means for generating said identification signal comprises a resistor pack that can be programmed to provide said unique identification signals.

17. A system as defined in claim 12 wherein said field point modules includes means for receiving serial data transmission from said multiplexing modules and for converting said serial data transmission to parallel outputs, said parallel outputs comprising said plurality of status lines.

18. A system as defined in claim 17 wherein each of said field point modules includes means for comparing the address appearing on said parallel outputs with the outputs of a resistor pack that can be programmed to produce said unique address signals.

19. A system as defined in claim 7 wherein one of said plurality of status lines is used to identify a received multi-bit word as an address by the distinct logical state thereof.

20. A system as defined in claim 19 wherein said one status line indicates a command in the event its distinct logical state is opposite the logical state that indicates an address.

21. A system as defined in claim 9 wherein said field point units are connected to said status lines, certain of said field point units also being connected to said command lines, in the event the particular field point unit is capable of receiving commands.

22. A system as defined in claim 21 wherein said field point units comprise means for providing digital electrical signals on said status lines that are indicative of the measurement being taken or condition being monitored.

23. A system as defined in claim 22 wherein said field point units provide digital electrical signals indicating the value of a temperature being measured.

24. A system as defined in claim 22 wherein said field point units generate digital electrical signals indicating the value of a pressure being measured.

25. A system as defined in claim 22 wherein said field point units generate digital electrical signals indicating the condition of an electrical contact.

26. A system as defined in claim 25 wherein said field point unit provides digital electric signals indicating the existence of open circuit, closed circuit, open contact and closed contact conditions.

27. A system as defined in claim 1 wherein each of said multiplexing modules can be connected to a maximum of 127 field point modules.

28. A system as defined in claim 1 wherein said field point modules and said multiplexing modules each include one or more random access memories and read-only memories for storing instructions, addresses, parameter limits and the like for use during the operation of the system.

29. A system for supervising and controlling equipment used to control the environmental conditions in a building or the like, comprising:
 a control console at which an operator can observe the operation of the environmental control equipment from data received from remote field points connected in said system;
 one or more multiplexing modules connected to one another and to said control console in a single leg circuit, each of said multiplexing modules sequentially addressing the remote field points connected thereto by selectively transmitting unique address signals to all of the field points connected thereto and receiving identification and status signals from the addressed field points, and multiplexing modules selectively issuing command signals for operating and adjusting control equipment associated with a field point;
 each of said field points comprising a field point module and one of various types of field point units, said field point modules receiving all of said address signals from the multiplexing module to which it is connected, each field point module identifying its unique address signals, each field point module transmitting field point module identification signals and status information signals from an associated field point unit in response to receiving its address signal, said addressed field point module receiving command signals from said multiplexing module and forwarding the same to the associated field point units;

said field point units producing electrical signals that are indicative of a measurement or condition, certain of said field point units implementing received command signals for effecting a control equipment adjustment or the like;

said field point modules associated with one of said multiplexing module being connected to one other and to said multiplexing module in a leg circuit.

30. A system as defined in claim 29 wherein said leg circuit connecting said multiplexing modules and said field point modules comprises two conductors for transmitting said address, command, identification and status signals.

31. A system as defined in claim 29 including two or more multiplexing modules, each of which independently and simultaneously addresses the various field point modules respectively connected thereto.

32. A system as defined in claim 29 wherein said field point units are adapted to produce electrical signals that are indicative of a measurement or condition of equipment that is used to control the environmental conditions in a building or the like.

* * * * *

UNITED STATES PATENT AND TRADEMARK OFFICE
CERTIFICATE OF CORRECTION

PATENT NO. : 4,090,248
DATED : May 16, 1978
INVENTOR(S) : James R. Swanson, Sam DiCesare, Richard C. Barthel It is certified that error appears in the above-identified patent and that said Letters Patent are hereby corrected as shown below:

Column 3, line 12, after "also" insert --supply--.

Column 4, line 60, after "circuitry" insert --72--.

Column 8, line 52, delete "AV-5-1014A" and insert --AY-5-1014A--.

Column 14, line 63, after "field points", delete "and" and insert therefor --said--.

Signed and Sealed this

Thirteenth Day of March 1979

[SEAL]

Attest:

RUTH C. MASON
Attesting Officer

DONALD W. BANNER
Commissioner of Patents and Trademarks